(12) United States Patent
Leonardi et al.

(10) Patent No.: US 11,728,702 B2
(45) Date of Patent: *Aug. 15, 2023

(54) ELECTRICAL MACHINE ROTOR WITH ELIMINATED IRON BRIDGE

(71) Applicant: FORD GLOBAL TECHNOLOGIES, LLC, Dearborn, MI (US)

(72) Inventors: Franco Leonardi, Dearborn Heights, MI (US); Michael W. Degner, Novi, MI (US); Chun Tang, Canton, MI (US); Edward Chan-Jiun Jih, Troy, MI (US); Kewei Xiao, Dearborn Heights, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/488,582

(22) Filed: Sep. 29, 2021

(65) Prior Publication Data
US 2022/0021254 A1 Jan. 20, 2022

Related U.S. Application Data

(62) Division of application No. 16/440,121, filed on Jun. 13, 2019, now Pat. No. 11,152,825.

(51) Int. Cl.
*H02K 1/28* (2006.01)
*H02K 1/276* (2022.01)
*B60K 6/26* (2007.10)

(52) U.S. Cl.
CPC ............. *H02K 1/28* (2013.01); *H02K 1/276* (2013.01); *B60K 6/26* (2013.01); *B60Y 2200/91* (2013.01); *B60Y 2200/92* (2013.01); *B60Y 2400/604* (2013.01)

(58) Field of Classification Search
CPC ................................. H02K 1/276; H02K 1/28
USPC ...................................................... 310/156.21
See application file for complete search history.

(56) References Cited

U.S. PATENT DOCUMENTS

| | | | |
|---|---|---|---|
| 8,896,175 B2 | 11/2014 | Cirani et al. | |
| 9,024,499 B2* | 5/2015 | Nakada | H02K 1/2766 310/156.57 |
| 9,369,012 B2 | 6/2016 | Hattori et al. | |
| 9,621,002 B2* | 4/2017 | Schreiber | H02K 1/28 |
| 10,320,249 B2* | 6/2019 | Okamoto | H02K 1/32 |
| 10,355,537 B2* | 7/2019 | Zhu | H02K 1/2766 |
| 2008/0093945 A1* | 4/2008 | Gruenhagen | H02K 1/278 310/156.19 |
| 2018/0287439 A1* | 10/2018 | Degner | H02K 1/2766 |
| 2019/0363594 A1* | 11/2019 | Qin | H02K 16/02 |

FOREIGN PATENT DOCUMENTS

| | | |
|---|---|---|
| CN | 203827088 U | 9/2014 |
| DE | 102018204765 A1 | 10/2018 |

* cited by examiner

*Primary Examiner* — Alexander Talpalatski
(74) *Attorney, Agent, or Firm* — David B. Kelley; Brooks Kushman P.C.

(57) ABSTRACT

A rotor for an electric machine includes pairs of magnets with a bridge region therebetween. Lamination that comprise the rotor may define openings in the bridge region between the magnets of each of the pairs. A clip may be installed in the openings and a bonding material may fill the remainder of the bridge region.

14 Claims, 9 Drawing Sheets

ELECTRICAL MACHINE ROTOR WITH ELIMINATED IRON BRIDGE

CROSS-REFERENCE TO RELATED APPLICATION

This application is a division of U.S. application Ser. No. 16/440,121, filed Jun. 13, 2019, the disclosure of which is hereby incorporated in its entirety by reference herein.

TECHNICAL FIELD

This application generally relates to rotor design for electric machines.

BACKGROUND

Electrified vehicles include electric machines for providing some or all of the propulsive force for moving the vehicle. Electric machines are powered by an electrical source such as a battery. As a battery can store a limited amount of energy, the electric machine may be designed to use that energy in a most efficient manner. Selecting an electric machine for vehicle applications may consider size, efficiency, and torque capability. Features that reduce the size, increase the torque capability, and improve efficiency of the electric machines can result in improved performance of the vehicle.

SUMMARY

A rotor for an electric machine includes a plurality of magnets and a core comprised of stacked laminations that define pockets, between a hub portion and a pole portion, for receiving pairs of magnets, and that define a first projection extending from the pole portion and a second projection extending from the hub portion, the first projection and the second projection disposed in a bridge region between magnets that comprise the pairs. The rotor further includes a bonding material disposed in the pocket. The rotor further includes a clip disposed within the pockets, embedded in the bonding material, and cooperating with the first projection, the second projection, and the bonding material to provide a structural connection between the hub portion and pole portion.

The rotor further includes a clip disposed within the pockets and coupled to the first projection and the second projection and a bonding material disposed in the pockets and embedding the clip, the first projection and the second projection.

The first projection and the second projection may each define a bar extending from the pole portion and the hub portion, respectively, and a cross-bar at a distal end to form a T-shape. The clip may include a bar extending between the first projection and the second projection and having arms that cooperate with each of the cross-bars to limit outward radial movement of the pole portion. The bonding material may be an epoxy. The bonding material may be a resin. The clip may be formed of a non-magnetic material. The bonding material may include non-magnetic particles to strengthen bonding.

A rotor for an electric machine includes a plurality of magnets and a core comprised of stacked laminations that define pockets, between a hub portion and a pole portion, for receiving pairs of magnets, and that define a first concavity in the pole portion and a second concavity in the hub portion, the first concavity and the second concavity disposed in a bridge region between magnets that comprise the pairs. The rotor further includes a clip disposed within the pockets and connecting the first concavity and the second concavity and a bonding material disposed in the pockets and embedding the clip, the first concavity and the second concavity.

The at least one of the first concavity and the second concavity may be oval-shaped. The clip may include a bar extending between the first concavity and the second concavity and having a first end that cooperates with the first concavity and a second end that cooperates with the second concavity such that, when inserted with the first end in the first concavity and the second in the second concavity, motion of the bar is limited. The clip may be formed of a non-magnetic metal material. The rotor may further include non-magnetic particles embedded in the bonding material to strengthen bonding. The bonding material may be an epoxy. The clip may be generally S-shaped.

A rotor for an electric machine includes a plurality of magnets and a core comprised of stacked laminations that define pockets, between a hub portion and a pole portion, for receiving pairs of magnets, and that define an opening in a bridge region between magnets that comprise the pairs. The rotor further includes a bonding material disposed in the pockets in the bridge region and at least one non-magnetic element embedded in the bonding material in the bridge region and extending axially in the core.

The non-magnetic element may be bar shaped. The at least one non-magnetic element may include at least one angled surface. The rotor may further include non-magnetic particles embedded in the bonding material to strengthen bonding. The bonding material may be an epoxy. The bonding material may be a resin.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
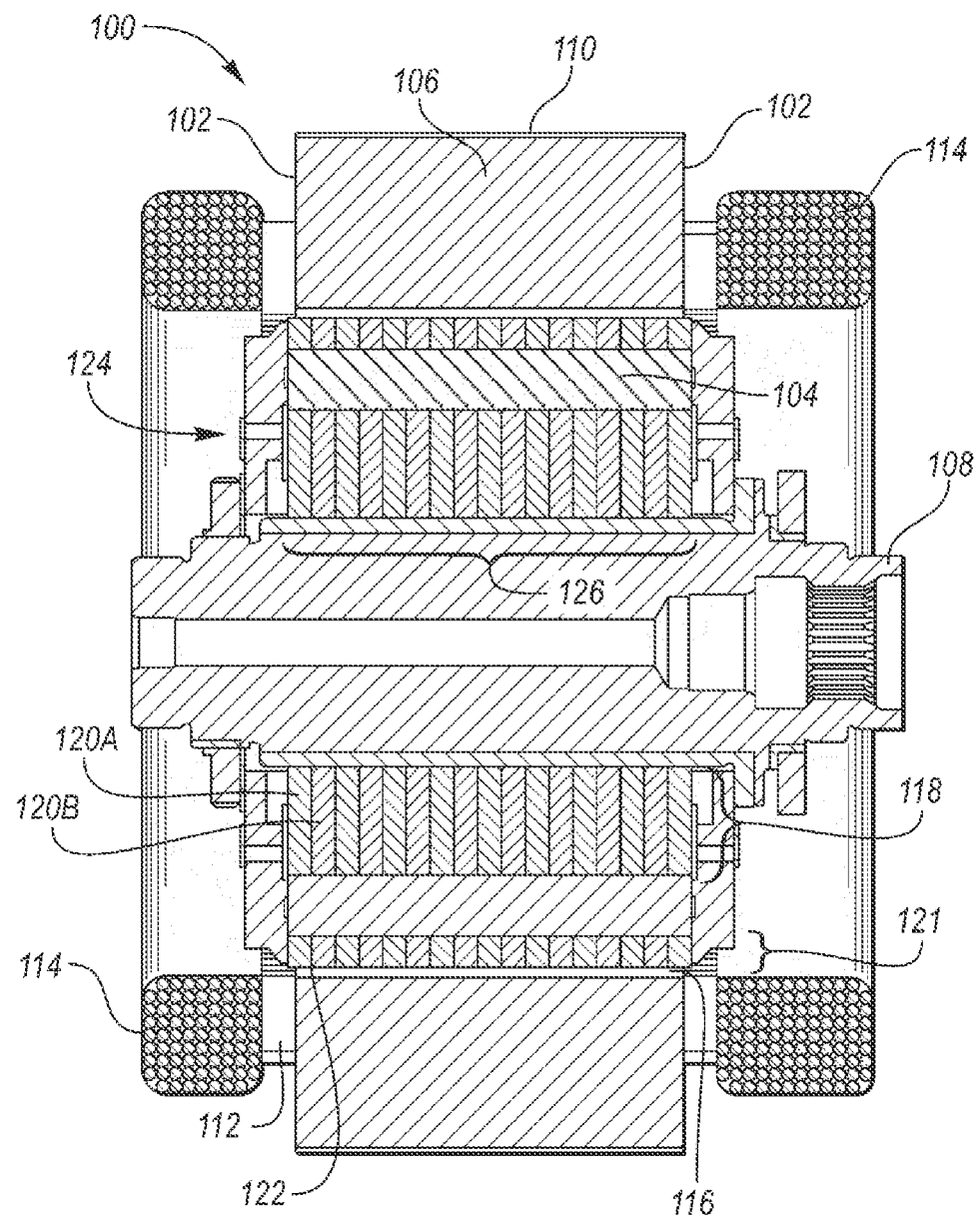
FIG. 1 depicts a possible configuration of an electric machine.

Referring to FIG. 1, an electric or hybrid electric vehicle may include an electric machine 100 for propelling the vehicle. The electric machine 100 may act as a motor and/or a generator depending upon operating conditions. The electric machine 100 may be a permanent magnet AC machine. While described as an electric machine for a vehicle, the electric machine 100 may be used in a wide range of applications.

The electric machine 100 may include a stator 110 having a plurality of laminations (not shown). Each of the laminations includes a front side and a back side. When stacked, the front and back sides are disposed against adjacent back and front sides to form a stator core 110. Each of the laminations may be toroidally-shaped and define a hollow center. Each lamination also includes an outer diameter (or outer wall) and an inner diameter (or inner wall). The outer diameters cooperate to define an outer surface of the stator core 110, and the inner diameters cooperate to define a cavity.

Each lamination may include a plurality of teeth extending radially inward toward the inner diameter. Adjacent teeth cooperate to define slots. The teeth and the slots of the laminations are aligned with each other to define stator slots extending through the stator core 110 between opposing end faces 102. The end faces 102 define the opposing ends of the core 110 and may be formed by the first and last laminations of the stator core 110. A plurality of windings (also known as coils, wires, or conductors) 106 are wrapped around the stator core 110 and are disposed within the stator slots. The windings 106 may be disposed in an insulating material (not shown). Portions of the windings 106 generally extend in an axial direction along the stator slots. At the end faces 102 of the stator core, the windings may bend to extend circumferentially around the end faces 102 of the stator core 110 forming end windings 114. The windings 106 may be distributed-type windings or may be concentrate-type windings.

A rotor 124 is disposed within the cavity and supported for rotation relative to the stator 110, which is typically a stationary component. The rotor 124 includes a rotor core 126 that may be formed of a plurality of stacked laminations 120. The laminations 120 are typically steel plates but may be formed of any material having a high magnetic permeability. Each of the laminations 120 may define one or more magnet pockets in a pocket region 104 that divides each lamination 120 into a central hub portion 118 and a pole portion 121 circumferentially arranged around the hub portion 118 near the periphery 122 of the rotor core 126. A plurality of magnets may be embedded in the pocket region 104 of the rotor core 126 with each magnet being disposed in a pocket that is formed in the pocket region 104 and extending axially through the rotor core 126. The arrangement and positions of the magnets define a plurality of poles of the rotor 124.

The rotor 124 may be supported on a shaft 108 and positioned inside the stator 110 so that an air gap 116 is formed between the rotor 124 and the stator 110. When current is supplied to the stator 110, a rotating magnetic field is created in the stator 110 generating a torque and causing the rotor 124 to spin within the stator 110. The shaft 108 is configured to output the torque to another component such as a gearbox.

Figure 2B:
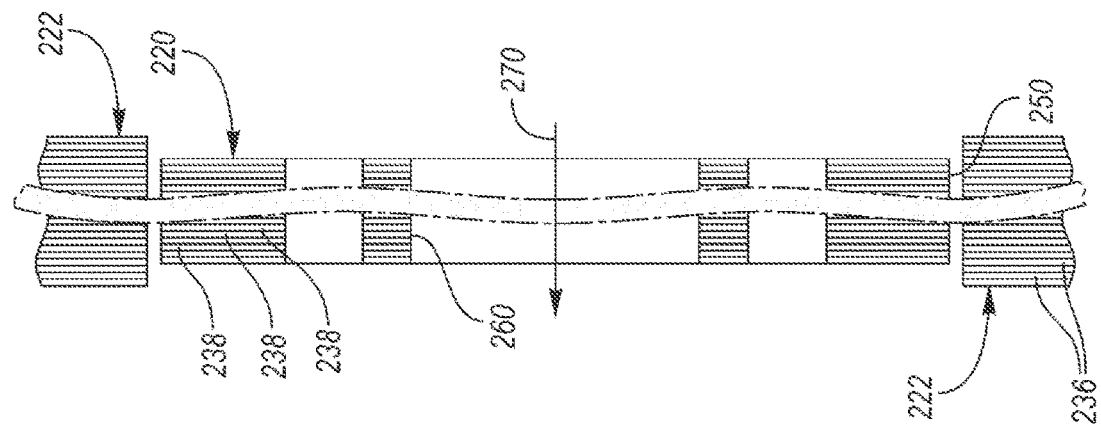
FIG. 2B is an example of a side view of a rotor constructed of a stack or rotor laminations.
Figure 2A:
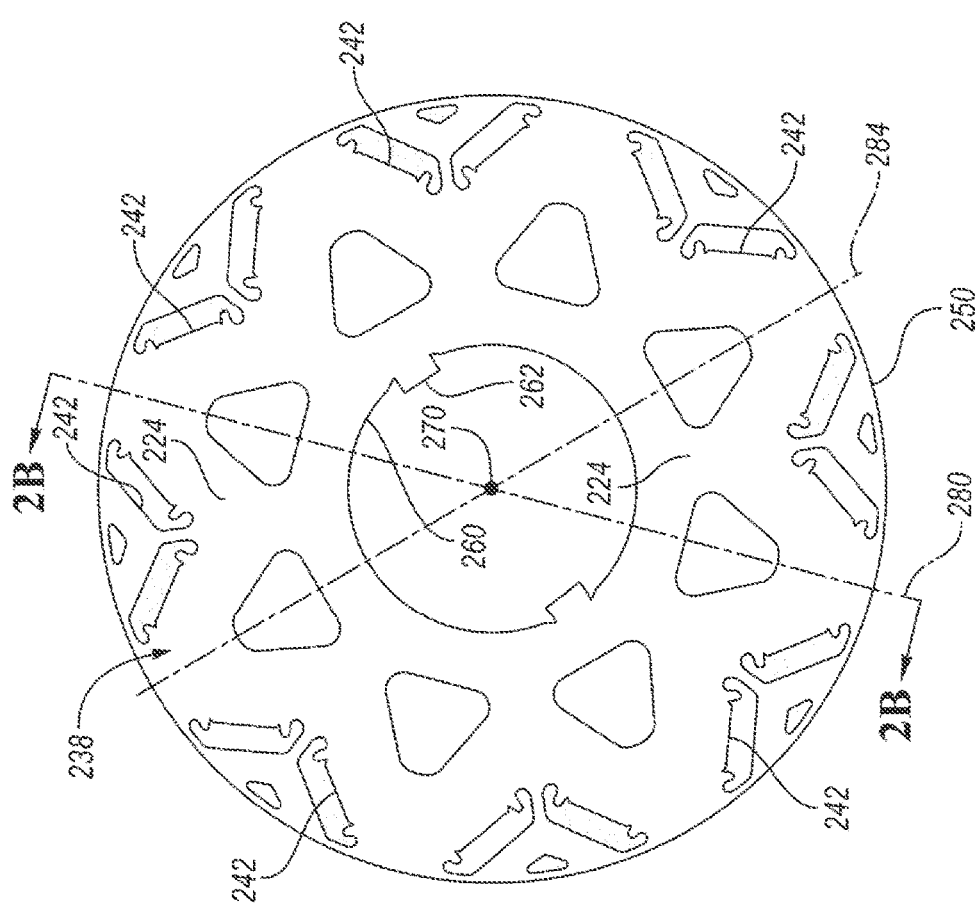
FIG. 2A is an example of a top view of a rotor lamination.

FIG. 2A depicts an example rotor lamination 238 and FIG. 2B depicts a side view of stator 222 and rotor 220 configurations having multiple rotor laminations 238 and multiple stator laminations 236 arranged in an axially stacked relationship. The rotor laminations 238 may define a circular central opening 260 for accommodating a drive shaft with a keyway that may receive a drive key 262. The rotor laminations 238 may define a plurality of magnet openings 242 that are symmetrically disposed with respect to adjacent pairs of magnet openings 242.

A plurality of rotor sectors 224 corresponding to magnetic poles of the rotor may be defined by a plurality of inter-polar axes (e.g., 280, 284) emanating from a central axis 270 of rotation to an outer surface 250 of the rotor lamination 238. Each of the sectors 224 may include a pair of magnet openings 242. The inter-polar axes (e.g., 280, 284) may be positioned to be midway between adjacent pairs of magnet openings 242. Note that FIG. 2A only shows two of the possible inter-polar axes 280, 284 and does not show all possible inter-polar axes. FIG. 2B depicts a series of axially stacked rotor laminations 238 that are stacked along the central axis 270 about which the rotor 220 is configured to rotate.

Figure 3:
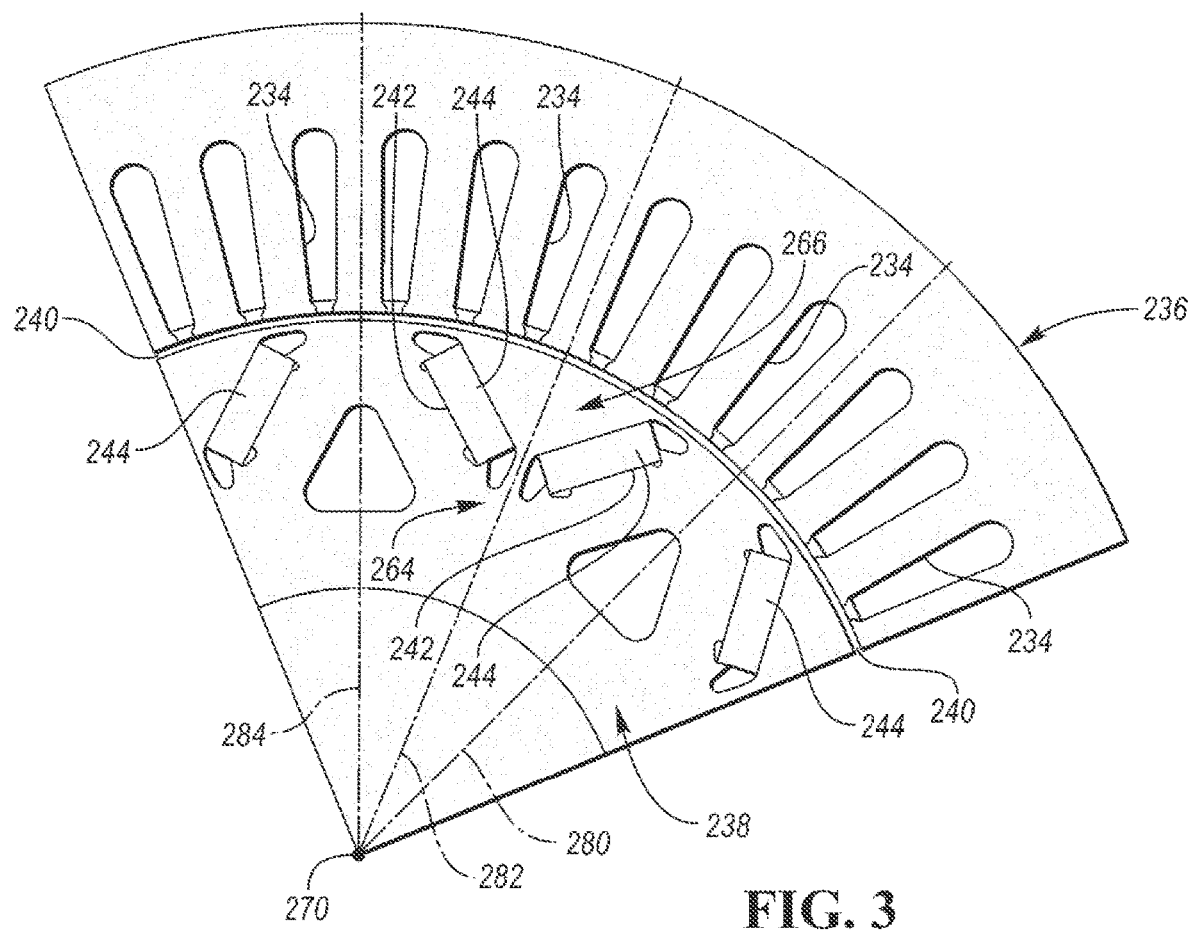
FIG. 3 is an example of partial rotor and stator laminations.

FIG. 3 depicts a partial radial cross-sectional view of a possible construction of the rotor 220 and the stator 222. A partial stator lamination 236 and a partial rotor lamination 238 are depicted in FIG. 3. The rotor laminations 238 and the stator laminations 236 may be comprised of a ferrous alloy. A small air gap 240 is located between the inner periphery of the stator laminations 236 and the outer periphery 250 of the rotor laminations 238. The stator laminations 236 may define radially extending openings 234 for receiving stator conductors or phase wiring.

The rotor laminations 238 may define symmetrically positioned magnet openings 242 near the outer periphery 250 of each rotor lamination 238. Each magnet opening 242 may be configured to receive a magnet 244. The magnet openings 242 may separate each of the sectors or poles of the rotor laminations 238 into a central hub portion 264 and a pole portion 266. Any number of laminations in a given design may be used, depending on design choice. The rotor laminations 238 and the stator laminations 236 may be arranged in a stack along the axis 270 of rotation. The axially stacked rotor laminations 238 and the magnets 244 may define a plurality of magnetic poles distributed about the axis 270.

The stator 222 may have conductors disposed in the radially extending openings 234 to form windings. The stator 222 may be comprised of an iron core made of a stack of stator laminations 236 and a winding arrangement for conductors that carry an excitation current. Current flowing through the stator winding generates a stator electromagnetic flux. The stator flux may be controlled by adjusting the magnitude and frequency of the current flowing through the stator windings. Because the stator windings are contained in openings 234 rather than a uniform sinusoidal distribution along the inner circumference of the stator, there may be harmonic fluxes in the stator flux.

The rotor 220 may be comprised of an iron core made of a stack of rotor laminations 238 and sets of permanent magnets 244 inserted within pockets or cavities 242 that are defined by the iron core. The permanent magnets 244 in the rotor 220 may generate a rotor electromagnetic flux. The rotor flux may include harmonic fluxes due to shapes and sizes of the discrete permanent magnets. The stator flux and the rotor flux may be distributed in the air-gap 240. Interaction between the stator flux and the rotor flux causes the rotor 220 to rotate about the axis 270.

Poles of the rotor 220 may be geometrically defined to correspond to the sectors 224 defined by the rotor laminations 238. Each of the poles may be represented by a sector 224. A pole location may be generally defined by a center-pole axis 282 that extends radially from the axis 270 toward the outer surface 250 of the rotor 220 along a midpoint between adjacent magnet openings 242 that comprise a pair. The inter-polar axes (e.g., 280, 284) may extend radially from the axis 270 toward the outer surface 250 of the rotor 238 between adjacent poles. An angular distance between two adjacent poles may define a pole pitch parameter. The arc length on the circumferential rotor surface 250 between two adjacent poles of the rotor may be referred to as the pole pitch. The pole pitch may be measured circumferentially around the outer rotor surface 250 between adjacent center-pole axes 282. Each pole may have an associated surface area on the outer circumferential surface 250 of the rotor 220. Each pole may be represented by the arc length on the surface between adjacent inter-polar axes 280, 284.

Figure 4:
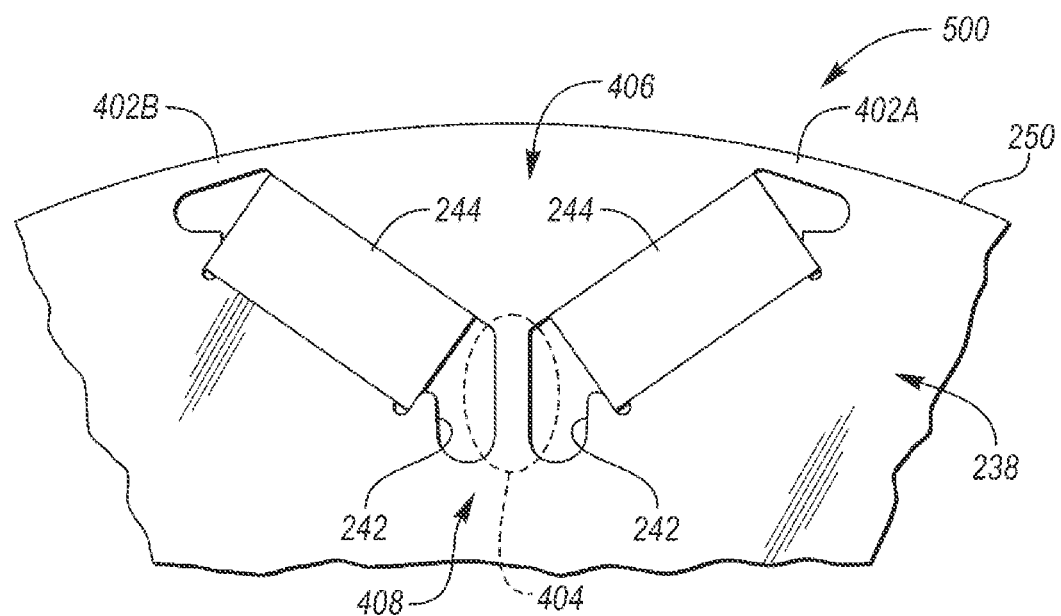
FIG. 4 is an example of a partial rotor lamination depicting a bridge region between magnets.

FIG. 4 depicts a partial view of the rotor lamination 238 with a magnet 244 inserted in the magnet openings 242. Poles of the rotor may be defined by pairs of magnets 244 that may be oriented to form a V-shape. FIG. 4 further highlights several regions of the rotor lamination 238. A pole portion 406 may include that portion of the rotor lamination 238 between the outer surface 250 and the magnet opening 242. A hub portion 408 may include that portion of the rotor lamination 238 between the magnet openings 242 and the central axis 270. The pole portion 406 and the hub portion 408 may be defined for each pole of the rotor. An outer bridge region 402 may be defined between the outer surface 250 and the portion of the magnet openings 242 that are closest to the outer surface 250. An inner bridge region 404 may be defined as a region between the adjacent magnet openings 242 in the area at which the distance between the magnet openings is a minimum. The inner bridge region 404 may include material that separates the adjacent magnet openings 242. The outer bridge regions 402 and the inner bridge region 404 help to maintain structural integrity of the rotor when spinning. For example, the inner bridge region 404 secures the central hub portion 408 to the pole portion 406. The outer bridge regions 402 and the inner bridge region 404 also produce a magnetic short-circuit that can result in reduced torque production by the electric machine.

Figure 5:
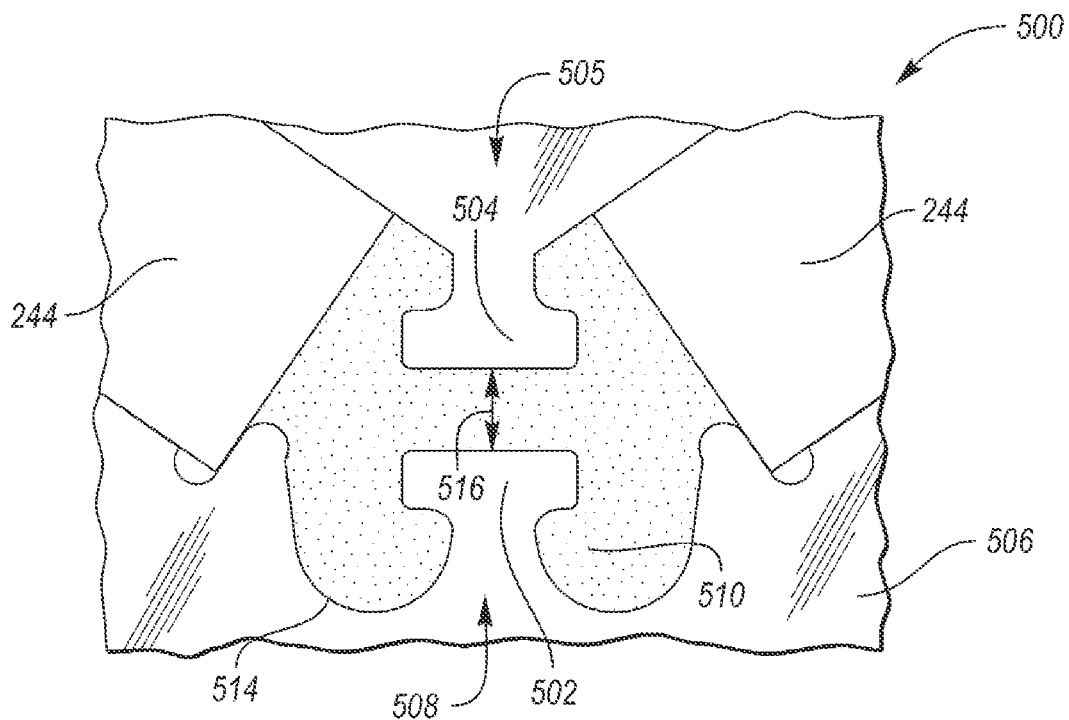
FIG. 5 depicts an example of a partial rotor lamination depicting a pocket defining projections in the bridge region.

Disclosed herein are rotor configurations in which the inner bridge region 404 is redefined to eliminate the flux leakage limitations. FIG. 5 depicts a first inner bridge rotor configuration 500. The first inner bridge rotor configuration 500 may be comprised of rotor laminations 506 constructed of a ferrous alloy and axially stacked. The rotor laminations 506 may define a cavity or pocket 514 configured to receive pairs of magnets 244 and further define a first projection 502 and a second projection 504. The first projection 502 and the second projection 504 may be formed in place of the inner bridge region (e.g., 404 of FIG. 4). The first projection 502 and the second projection 504 may be separated by a gap 516. This first projection 502 may extend from a hub portion 508 of the rotor laminations 506. The second projection 504 may be extend from a pole portion 505 of the rotor laminations 506. The rotor laminations 506 may be constructed such that the pocket 514 is formed that includes regions for insertion of a pair of magnets 244. Areas of the pocket 514 that do not receive the magnets 244 may be filled with a solid non-magnetic material 510. For example, the solid non-magnetic material 510 may be a resin, aluminum, copper, or stainless steel. The solid non-magnetic material 510 may be formed in the appropriate shape to match a shape of the pocket 514 and be inserted in the pocket 514. In some configurations, the solid-non-magnetic material 510 may be flowed into empty regions of the pocket 514 and cured to a hardened state.

The first projection 502 and the second projection 504 may be defined to lock the portions of the rotor lamination 506 to the solid non-magnetic material 510 that fills the pocket 514 to maintain the structural integrity. The first projection 502 and the second projection 504 may be generally shaped to form a narrow portion extending from the hub portion 508 or the pole portion 505 and a wider portion at a distal end proximate the gap 516. In the example, the first projection 502 and the second projection 504 are T-shaped. The first projection 502 and the second projection 504 may be defined as opposed T-shaped features that define the gap 516 therebetween. As the first projection 502 and the second projection 504 are separated by the gap 516, the flux leakage path is severed.

Figure 6:
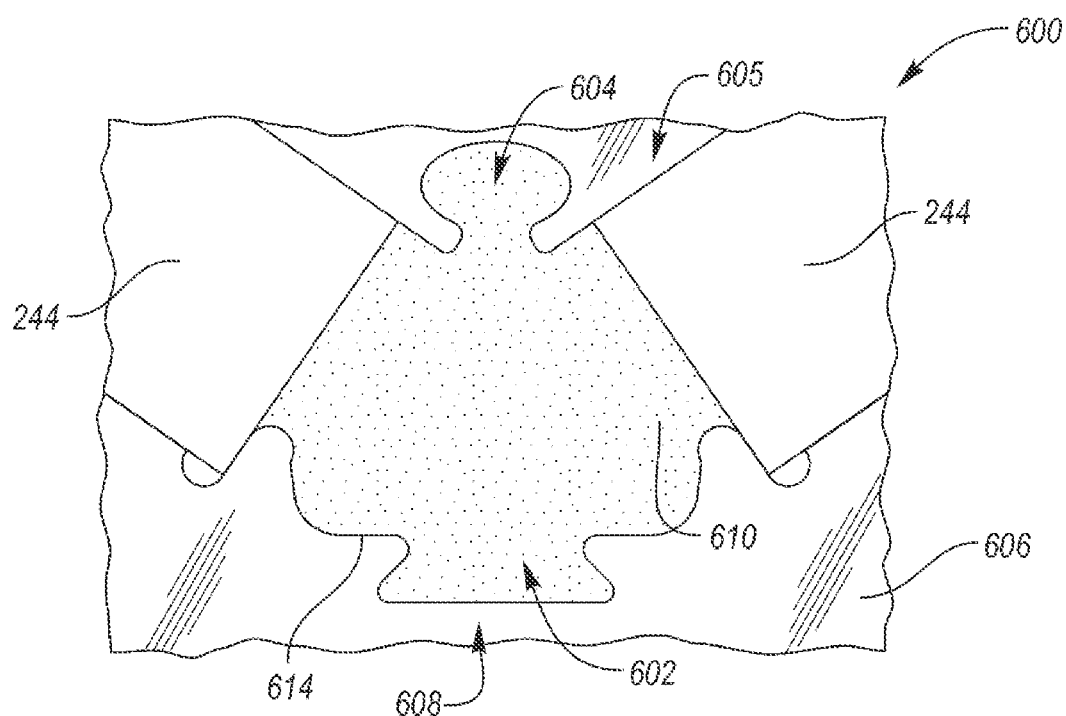
FIG. 6 depicts an example of a partial rotor lamination depicting a pocket defining concavities in the bridge region.

FIG. 6 depicts a second inner bridge rotor configuration 600. The second inner bridge rotor configuration 600 may be comprised of rotor laminations 606 constructed of a ferrous alloy and axially stacked. The rotor laminations 606 may define a cavity or pocket 614 that includes a first concavity 602 and a second concavity 604. The first concavity 602 and the second concavity 604 may be formed in place of the inner bridge region (e.g., 404 of FIG. 4). The first concavity 602 may be defined by a hub portion 508 of the rotor laminations 606. The second concavity 604 may be defined by a pole portion 605 of the rotor laminations 606. The rotor laminations 606 may be constructed such that the pocket 614 that is formed includes regions for receiving a pair of magnets 244. Areas of the pocket 614 that do not receive the magnets 244 may be filled with a solid non-magnetic material 610. For example, the solid non-magnetic material 610 may be a resin, aluminum, copper, or stainless steel. The solid non-magnetic material 610 may be formed in the appropriate shape and inserted in the pocket 614.

The first concavity 602 and the second concavity 604 may be defined to lock the portions of the rotor lamination 606 to the solid non-magnetic material 610 that fills the pocket 614 to maintain the structural integrity. In the example, the first concavity 602 is shaped as a three-sided trapezoid and the second concavity 604 is shaped as an incomplete oval. The first concavity 602 and the second concavity 604 may be defined on opposite sides of the pocket 614. As the first concavity 602 and the second concavity 604 are separated by the gap, the flux leakage path is severed.

FIG. 5 and FIG. 6 provide examples of concave and projection features. In other configurations, the concave features and projection features may be combined in a rotor lamination. For example, a rotor lamination that defines a projection feature and a concave feature are possible.

Figure 7:
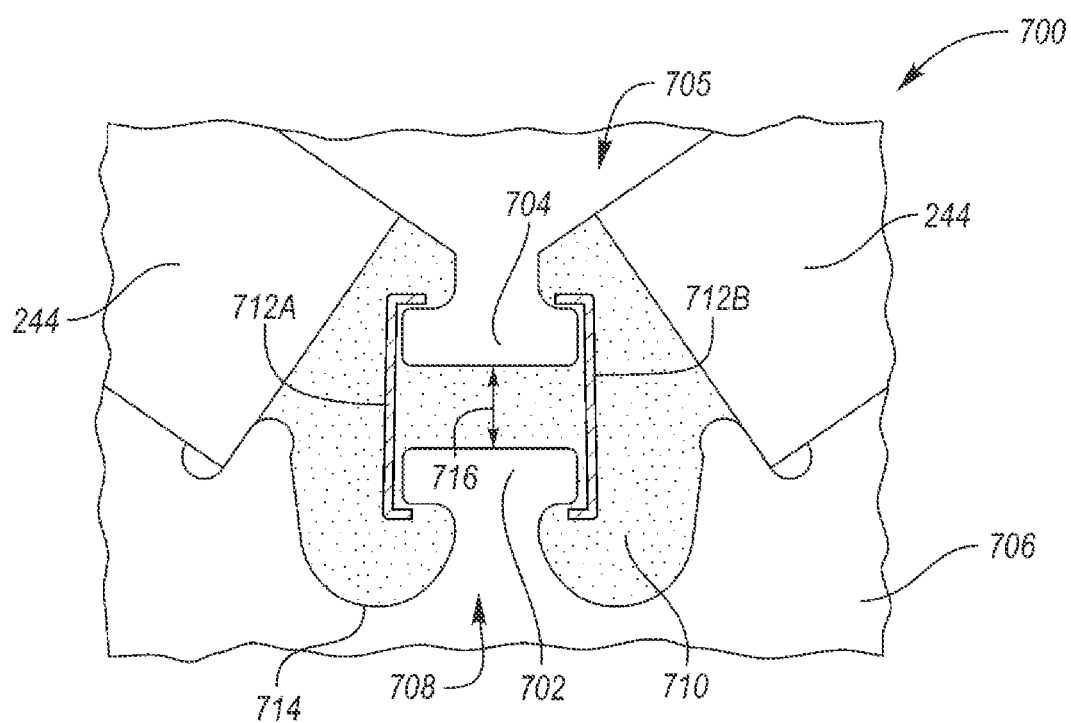
FIG. 7 depicts an example of a partial rotor lamination depicting a pocket defining projections in the bridge region and clips cooperating with the projections.

FIG. 7 depicts a third inner bridge rotor configuration 700. The third inner bridge rotor configuration 700 may be comprised of rotor laminations 706 constructed of a ferrous alloy and axially stacked. The rotor laminations 706 may define a cavity or pocket 714 that further defines a first projection 702 and a second projection 704. The first projection 702 and the second projection 704 may be formed in place of the inner bridge region (e.g., 404 of FIG. 4). The first projection 702 and the second projection 704 may be separated by a gap 716. The first projection 702 may extend from a hub portion 708 of the rotor laminations 706. The second projection 704 may extend from a pole portion 705 of the rotor laminations 706. The rotor laminations 706 may be constructed such that the pocket 714 is defined that includes regions for receiving a pair of magnets 244.

The third inner bridge rotor configuration 700 may further include one or more clips 712 cooperating with the first projection 702 and the second projection 704 to strengthen a connection between the pole portion 705 and the hub portion 708 of the rotor laminations 706. The first projection 702 and the second projection 704 may be configured to provide a surface to accept an arm of the clips 712. For example, the first projection 702 and the second projection 704 may each define a bar extending from the pole portion 705 and the hub portion 708, respectively, and a cross-bar at a distal end to form a T-shape. The clips 712 may be sized such that arms of the clip 712 contact the surface on each of the projections. The clips 712 may be constructed of a non-magnetic material or metal. The clips 712, when coupled to the projections, may apply a force that draws the pole portion 705 and the hub portion 708 together. The clips 712 depicted are generally U-shaped with right angles (e.g., resembling a staple) and interact with the cross-bars of the T-shaped projections to prevent the gap 716 from increasing. The clip 712 may include a bar that extends between the first projection 702 and the second projection 704 and have arms that cooperate with each of the cross-bars to limit outward radial movement of the pole portion 705.

Areas of the pocket 714 that do not receive the magnets 244 may be filled with a non-magnetic bonding material 710. For example, the non-magnetic bonding material 710 may be a resin, epoxy, or similar adhesive bonding material. The non-magnetic bonding material 710 may be a thermosetting polymer (thermoset) that may start as a soft or viscous liquid that hardens after curing. The non-magnetic bonding material 710 may form a structural connection between surfaces to which it is bonded. The clips 712 and the non-magnetic bonding material 710 may cooperate to prevent movement of the pole portion 705 away from the hub portion 708 during rotation. The first projection 702 and the second projection 704 may be embedded in the non-magnetic bonding material 710 to further strengthen the connection. The rotor may be constructed by inserting the clips 712 and magnets 244 into the pockets 714 of the stacked rotor laminations 706. The non-magnetic bonding material 710 may be flowed or inserted into the portions of the pocket 714 that are not occupied by the clips 712 and magnets 244. The non-magnetic bonding material 710 may be applied as a liquid or gel having a viscosity that permits flow into and within the pocket 714. The non-magnetic bonding material 710 may harden to a solid when cured. The clips 712, the first projection 702 and the second project 704 may be embedded in the non-magnetic bonding material 710 and provide a structural connection between the hub portion 708 and the pole portion 705. The description of the non-magnetic bonding material 710 is applicable to later rotor configurations that are described herein.

Figure 8:
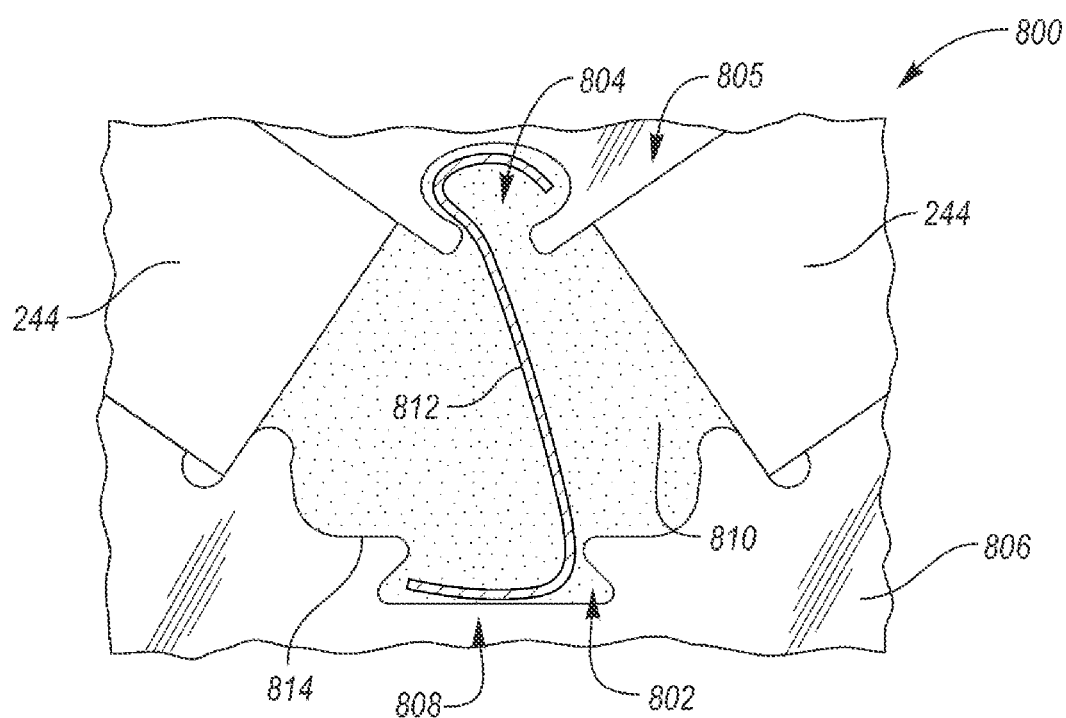
FIG. 8 depicts an example of a partial rotor lamination depicting a pocket defining concavities in the bridge region and a clip cooperating with the concavities.

FIG. 8 depicts a fourth inner bridge rotor configuration 800. The fourth inner bridge rotor configuration 800 may be comprised of rotor laminations 806 constructed of a ferrous alloy and axially stacked. The rotor laminations 806 may define a pocket 814 that further defines a first concavity 802 and a second concavity 804. The first concavity 802 and the second concavity 804 may be formed in place of the inner bridge region (e.g., 404 of FIG. 4). The first concavity 802 may be formed in a hub portion 808 of the rotor laminations 806. The second concavity 804 may be formed in a pole portion 805 of the rotor laminations 806. The rotor laminations 806 may be constructed such that the pocket 814 includes regions for receiving a pair of magnets 244.

The fourth inner bridge rotor configuration 800 may further include a clip 812 cooperating with the first concavity 802 and the second concavity 804 to strengthen a connection between the pole portion 805 and the hub portion 808 of the rotor laminations 806. The first concavity 802 and the second concavity 804 may be configured to provide a receiving area to accept an end of the clip 812. The clip 812 may be sized such that ends of the clip 812 fit into the regions defined by the first concavity 802 and the second concavity 804. The clip 812 may be constructed of a non-magnetic material or metal. The clip 812, when inserted within the pocket 814, including the first concavity 802 and the second concavity 804, may apply a force that prevents the pole portion 805 and the hub portion 808 from separating. The clip 812 depicted is generally S-shaped to fit in the openings defined by the first concavity 802 and the second concavity 804. The ends of the clip 812 may be configured to contact opposed surfaces within the interior space of the concavities. The clip 812 may be configured such that, when installed, the clip 812 applies a force to resist an increase in the distance between the first concavity 802 and the second concavity 804.

Areas of the pocket 714 that do not receive the magnets 244 may be filled with a non-magnetic bonding material 810. For example, the non-magnetic bonding material 810 may be a resin, epoxy, thermoset, or similar adhesive bonding material. The first concavity 802 and the second concavity 804 may be embedded in the non-magnetic bonding material 810 to further strengthen the connection. The clip 812 and the non-magnetic-bonding material 810 may cooperate to prevent movement of the pole portion 805 away from the hub portion 808 during rotation. The rotor may be constructed by inserting the clip 812 and magnets 244 into the stacked rotor laminations 806. The non-magnetic bonding material 810 may be flowed or inserted into the portions of the pocket 814 that are not occupied by the clip 812 and magnets 244. The non-magnetic bonding material 810 may be applied as a liquid or gel having a viscosity that permits flow into and within the pocket 814. The non-magnetic bonding material 810 may harden to a solid when cured. The clip 812, the first concavity 802 and the second concavity 804 may be embedded in the non-magnetic bonding material 810 and cooperate to provide a structural connection between the hub portion 808 and the pole portion 805.

Figure 9:
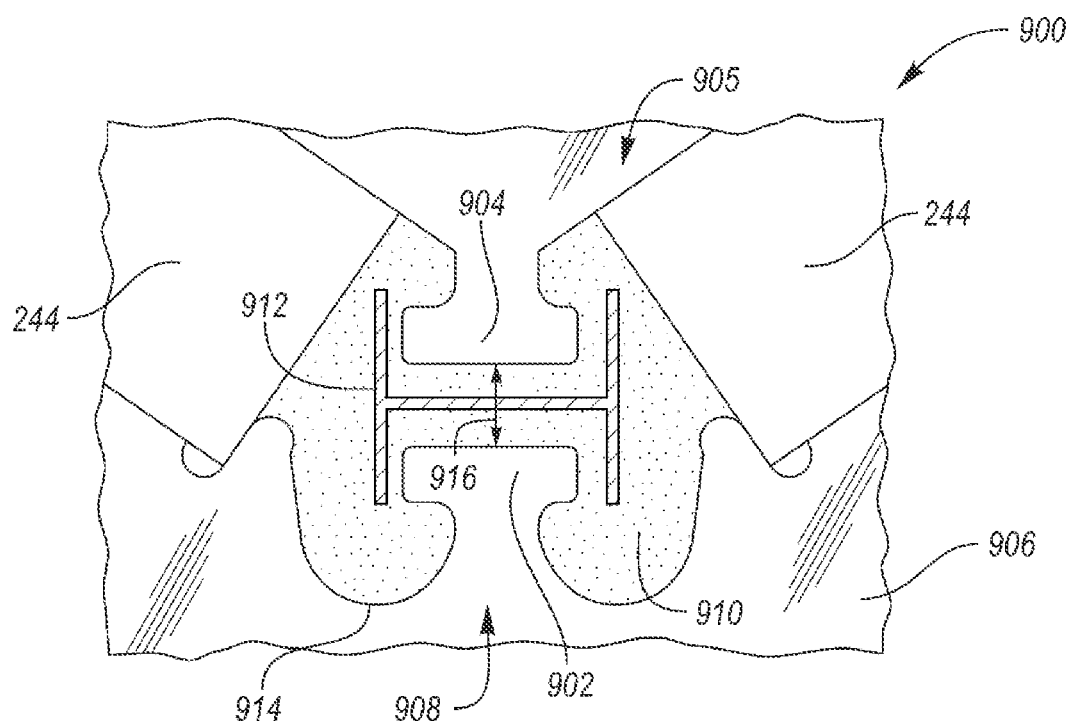
FIG. 9 depicts an example of a partial rotor lamination depicting a pocket defining projections in the bridge region and a clip inserted between the projections.

FIG. 9 depicts a fifth inner bridge rotor configuration 900. The fifth inner bridge rotor configuration 900 may be comprised of rotor laminations 906 constructed of a ferrous alloy and axially stacked. The rotor laminations 906 may define a pocket 914 that further defines a first projection 902 and a second projection 904. The first projection 902 and the second projection 904 may be formed in place of the inner bridge region (e.g., 404 of FIG. 4). The first projection 902 and the second projection 904 may be separated by a gap 916. The first projection 902 may extend from a hub portion 908 of the rotor laminations 906. The second projection 904 may extend from a pole portion 905 of the rotor laminations 906. The rotor laminations 906 may be constructed such that the pocket 914 includes regions for receiving a pair of magnets 244.

The fifth inner bridge rotor configuration 900 may further include a clip 912 that is inserted between the first projection 902 and the second projection 904 to strengthen the bond between the portions of the rotor lamination 906. The clip 912 may be constructed of a non-magnetic material or metal. The clip 912 depicted is generally H-shaped with a central bar disposed between the first projection 902 and the second projection 904. The vertical bars of the clip 912 may contact portions of the first projection 902 and the second projection 904. The clip 912 may improve the bond between the first projection 902 and the second projection 904 when epoxy or adhesive bonding material is inserted to fill the pocket 914. In some configurations, the clip 912 may include arms that cooperate with the projections similar to those shown in FIG. 7.

Areas of the pocket 914 that do not receive the magnets 244 may be filled with a non-magnetic bonding material 910. For example, the non-magnetic bonding material 910 may be a resin, epoxy, thermoset, or similar adhesive bonding material. The first projection 902 and the second projection 904 may be embedded in the non-magnetic bonding material 910 to further strengthen the connection. The clip 912 and the non-magnetic bonding material 910 may cooperate to prevent movement of the pole portion 905 away from the hub portion 908 during rotation. The rotor may be constructed by inserting the clip 912 and magnets 244 into the stacked rotor laminations 906. The non-magnetic bonding material 910 may be flowed or inserted into the portions of the pocket 914 that are not occupied by the clip 912 and magnets 244. The non-magnetic bonding material 910 may be applied as a liquid or gel having a viscosity that permits flow into and within the pocket 914. The non-magnetic bonding material 910 may harden to a solid when cured. The clip 912, the first projection 902 and the second projection 904 may be embedded in the non-magnetic bonding material 910 and cooperate to provide a structural connection between the hub portion 908 and the pole portion 905.

Figure 10:
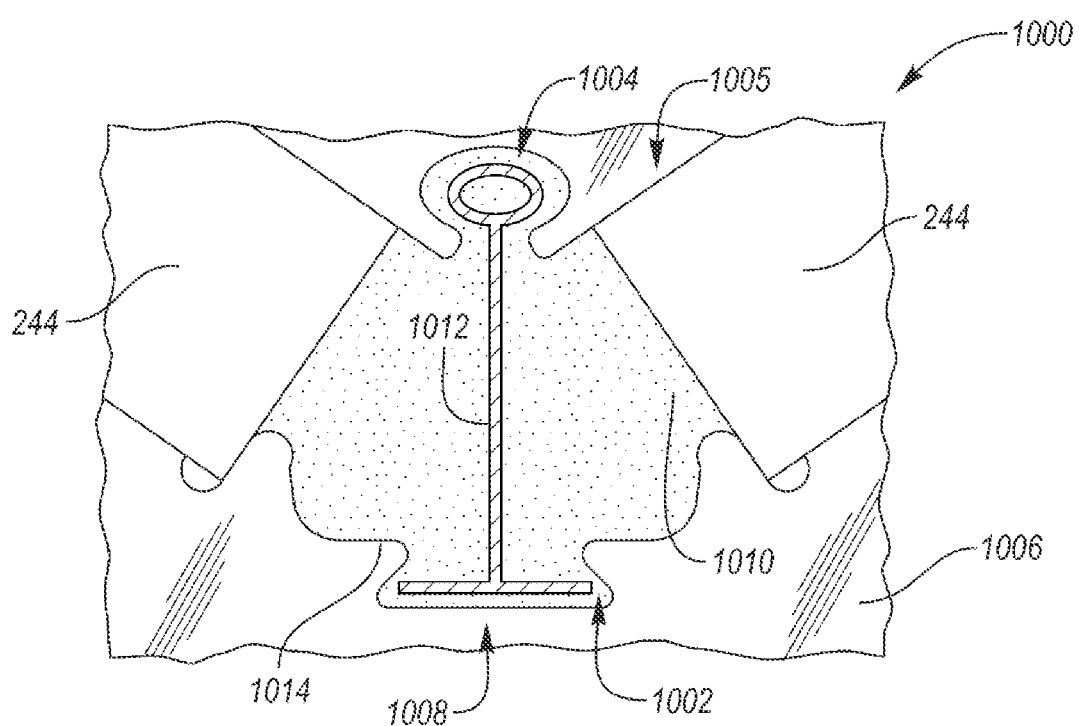
FIG. 10 depicts another example of a partial rotor lamination depicting a pocket defining concavities in the bridge region and a clip cooperating with the concavities.

FIG. 10 depicts a sixth inner bridge rotor configuration 1000. The sixth inner bridge rotor configuration 1000 may be comprised of rotor laminations 1006 constructed of a ferrous alloy and axially stacked. The rotor lamination 1006 may define a pocket 1014 that further defines a first concavity 1002 and a second concavity 1004. The first concavity 1002 and the second concavity 1004 may be formed in place of the inner bridge region (e.g., 404 of FIG. 4). The first concavity 1002 may be associated with a hub portion 1008 of the rotor laminations 1006. The second concavity 1004 may be associated with a pole portion 1005 of the rotor laminations 1006. The rotor laminations 1006 may be constructed such that the pocket 1014 includes regions for receiving a pair of magnets 244.

The sixth inner bridge rotor configuration 1000 may further include a clip 1012 cooperating with the first concavity 1002 and the second concavity 1004 to strengthen the lock between the hub portion 1008 and the pole portion 1005. The first concavity 1002 and the second concavity 1004 may be configured to provide a receiving area to accept an end of the clip 1012. The clip 1012 may be configured such that ends of the clip 1012 fit into the openings defined by the first concavity 1002 and the second concavity 1004. The clip 1012 may be constructed of a non-magnetic material or metal. The clip 1012 depicted includes a circular shaped end that is configured to fit into the opening defined by the second concavity 1004 and a cross-bar configured to fit in the opening defined by the first concavity 1002. The ends of the clip 1012 may be connected by a bar element. The ends of the clip 1012 may be formed such that the ends cannot exit the concavities in a radial direction and radial motion of the clip 1012 is limited once the clip 1012 is inserted. The clip 1012 may be configured such that, when installed, the clip 1012 prevents an increase in the distance between the first concavity 1002 and the second concavity 1004.

Areas of the pocket 1014 that do not receive the magnets 244 may be filled with a non-magnetic bonding material 1010. For example, the non-magnetic bonding material 1010 may be a resin, epoxy, thermoset, or similar adhesive bonding material. The first concavity 1002 and the second concavity 1004 may be embedded in the non-magnetic bonding material 1010 to further strengthen the connection. The clip 1012 and the non-magnetic bonding material 1010 may cooperate to prevent movement of the pole portion 1005 away from the hub portion 1008 during rotation. The rotor may be constructed by inserting the clip 1012 and magnets 244 into the stacked rotor laminations 1006. The non-magnetic bonding material 1010 may be flowed or inserted into the portions of the pocket 1014 that are not occupied by the clip 1012 and magnets 244. The non-magnetic bonding material 1010 may be applied as a liquid or gel having a viscosity that permits flow into and within the pocket 1014. The non-magnetic bonding material 1010 may harden to a solid when cured. The clip 1012, the first concavity 1002 and the second concavity 1004 may be embedded in the non-magnetic bonding material 1010 and cooperate to provide a structural connection between the hub portion 1008 and the pole portion 1005.

Figure 11:
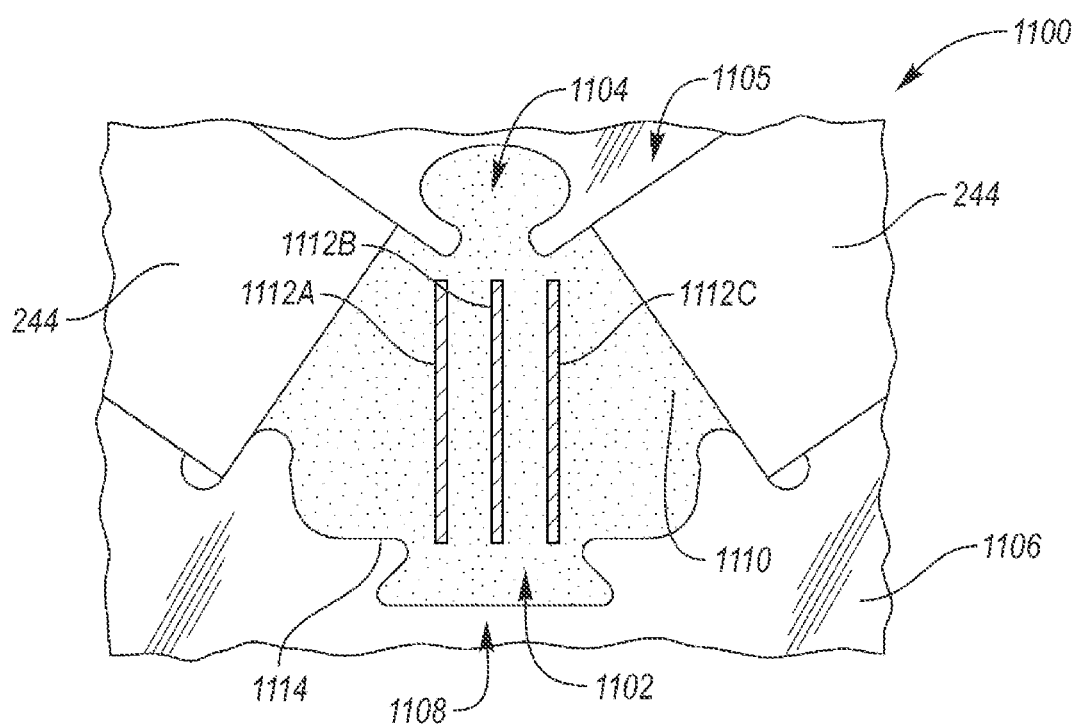
FIG. 11 depicts an example of a partial rotor lamination depicting a pocket defining concavities in the bridge region and structural elements placed in the opening between the concavities.

FIG. 11 depicts a seventh inner bridge rotor configuration 1100. The seventh inner bridge rotor configuration 1100 may be comprised of rotor laminations 1106 constructed of a ferrous alloy and axially stacked. The rotor laminations 1106 may define a pocket 1114 that further defines a first concavity 1102 and a second concavity 1104. The first concavity 1102 and the second concavity 1104 may be formed in place of the inner bridge region (e.g., 404 of FIG. 4). The rotor lamination 1106 may be constructed such that the pocket 1114 includes regions for receiving a pair of magnets 244. The first concavity 1102 may be defined in a hub portion 1108 of the rotor laminations 1106. The second concavity 1104 may be defined in a pole portion 1105 of the rotor laminations 1106.

Areas of the pocket 1114 that do not receive the magnets 244 may be filled with a non-magnetic bonding material 1110. For example, the non-magnetic bonding material 1110 may be a resin, epoxy, thermoset, or similar adhesive bonding material. The seventh inner bridge rotor configuration 1100 may further include one or more non-magnetic elements 1112 cooperating with the non-magnetic bonding material 1110 to strengthen the bond between the portions of the rotor lamination 1106. The non-magnetic elements 1112 may be constructed of a composite or metal that is non-magnetic. The non-magnetic elements 1112 depicted are straight elements. In this configuration, the non-magnetic elements 1112 may be arranged such that the non-magnetic elements 1112 are not within the openings defined by the first concavity 1102 and the second concavity 1104. The non-magnetic elements 1112 may be inserted in parallel to one another in a generally radial direction. In some configurations, the non-magnetic elements 1112 may be coupled together with cross-bars. The non-magnetic elements 1112 may provide support for the non-magnetic bonding material 1110 during the curing process.

The rotor may be constructed by inserting the non-magnetic elements 1112 and the magnets 244 into the stacked rotor laminations 1106. The non-magnetic bonding material 1110 may be flowed or inserted into the portions of the pocket 1114 that are not occupied by the non-magnetic elements 1112 and magnets 244. The non-magnetic bonding material 1110 may be applied as a liquid or gel having a viscosity that permits flow into and within the pocket 1114. The non-magnetic bonding material 1110 may flow around the non-magnetic elements 1112 and the magnets such that the non-magnetic elements 1112 are embedded in the non-magnetic bonding material 1110. The non-magnetic bonding material 1110 may harden to a solid when cured to provide a structural connection between the hub portion 1108 and the pole portion 1105. The first concavity 1102 and the second concavity 1104 are also embedded in the non-magnetic bonding material 1110.

Figure 12:
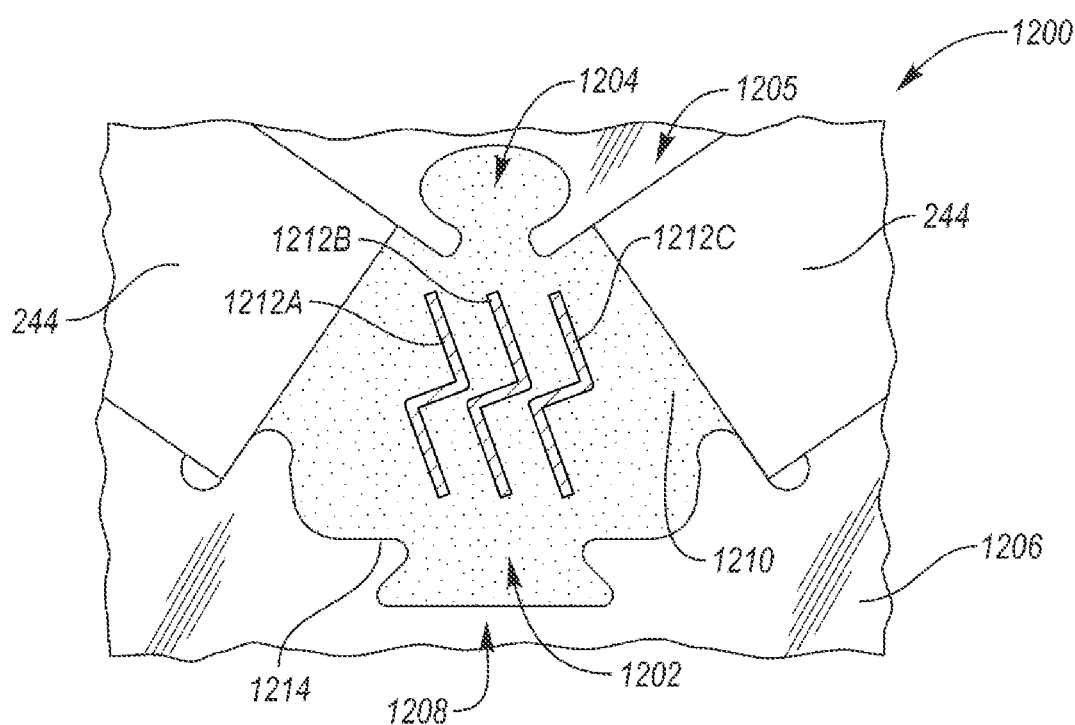
FIG. 12 depicts another example of a partial rotor lamination depicting a pocket defining concavities in the bridge region and shaped-structural elements placed in the opening between the concavities.

FIG. 12 depicts an eighth inner bridge rotor configuration 1200. The eighth inner bridge rotor configuration 1200 may be comprised of rotor laminations 1206 constructed of a ferrous alloy and axially stacked. The rotor laminations 1206 may define a pocket 1214 that further defines a first concavity 1202 and a second concavity 1204. The first concavity 1202 and the second concavity 1204 may be formed in place of the inner bridge region (e.g., 404 of FIG. 4). The rotor lamination 1206 may be constructed such that the pocket 1214 includes regions for receiving a pair of magnets 244. The first concavity 1202 may be defined in a hub portion 1208 of the rotor laminations 1206. The second concavity 1204 may be defined in a pole portion 1205 of the rotor laminations 1206.

Areas of the pocket 1214 that do not receive the magnets 244 may be filled with a non-magnetic bonding material 1210. For example, the non-magnetic bonding material 1210 may be a resin, epoxy, or similar adhesive bonding material. The eighth inner bridge rotor configuration 1200 may further include one or more non-magnetic elements 1212 cooperating with the non-magnetic bonding material 1210 to strengthen the bond between the portions of the rotor lamination 1206. The non-magnetic elements 1212 may be constructed of a material such a metal or composite that is non-magnetic. The non-magnetic elements 1212 depicted include at least one angled surface. A right-angle bend is depicted, but other angles are possible. For example, the surface may be ridged or wavy. For example, the non-magnetic elements 1212 may define a wavy or ruffled surface. The non-magnetic elements 1212 may be arranged such that the non-magnetic elements 1212 are not within the openings defined by the first concavity 1202 and the second concavity 1204. The non-magnetic elements 1212 may provide support for the non-magnetic bonding material 1210 during the curing process. By incorporating a wavy or shaped surface, the non-magnetic elements 1212 may present more surface area for bonding to the non-magnetic bonding material 1210.

The rotor may be constructed by inserting the non-magnetic elements 1212 and magnets 244 into the stacked rotor laminations 1206. The non-magnetic bonding material 1210 may be flowed or inserted into the portions of the pocket 1214 that are not occupied by the non-magnetic elements 1212 and magnets 244. The non-magnetic bonding material 1210 may be applied as a liquid or gel having a viscosity that permits flow into and within the pocket 1214. The non-magnetic bonding material 1210 may flow around the non-magnetic elements 1212 such that the non-magnetic elements 1212 are embedded in the non-magnetic bonding material 1210. The non-magnetic bonding material 1210 may harden to a solid when cured to provide a structural connection between the hub portion 1208 and the pole portion 1205. The first concavity 1202 and the second concavity 1204 are also embedded in the non-magnetic bonding material 1210.

Figure 13:
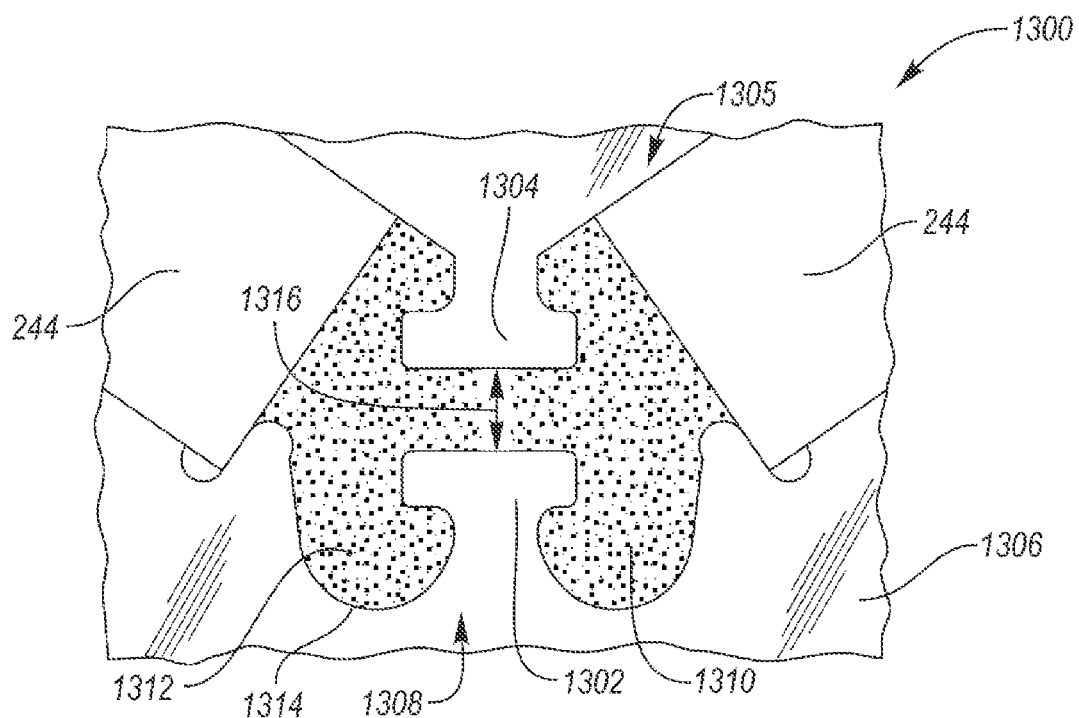
FIG. 13 depicts an example of a partial rotor lamination depicting a pocket defining projections in the bridge region and filled with an epoxy including filler particles.

FIG. 13 depicts a ninth inner bridge rotor configuration 1300. The ninth inner bridge rotor configuration 1300 may be comprised of a rotor lamination 1306 constructed of a ferrous alloy and axially stacked. The rotor lamination 1306 may define a pocket 1314 that further defines a first projection 1302 and a second projection 1304. The first projection 1302 and the second projection 1304 may be formed in place of the inner bridge region (e.g., 404 of FIG. 4). The first projection 1302 and the second projection 1304 may be separated by a gap 1316. The rotor lamination 1306 may be constructed such that the pocket 1314 includes regions for receiving a pair of magnets 244. The first projection 1302 may extend from a hub portion 1308 of the rotor laminations 1306. The second projection 1304 may extend from a pole portion 1305 of the rotor laminations 1306.

Areas of the pocket 1314 that do not receive the magnets 244 may be filled with a non-magnetic bonding material 1310. For example, the non-magnetic bonding material 1310 may be a resin, epoxy or other adhesive. Non-magnetic particles 1312 may be added to the non-magnetic bonding material 1310 to strengthen the bond. The non-magnetic particles 1312 may be formed from a metal and/or composite that material that is non-magnetic. The non-magnetic particles 1312 may be sized to fit within any areas of the pocket 1314. The non-magnetic particles 1312 may be mixed with the non-magnetic bonding material 1310 in a predetermined ratio. The first projection 1302 and the second projection 1304 may be embedded in the non-magnetic bonding material 1310 to provide a strong structural connection between the hub portion 1308 and the pole portion 1305.

Figure 14:
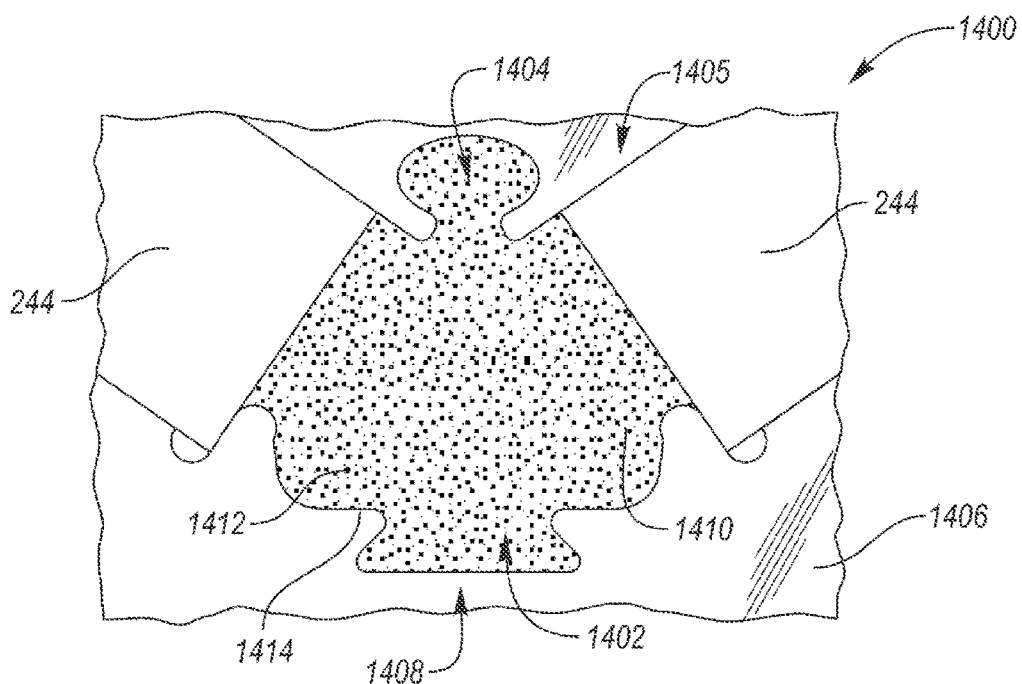
FIG. 14 depicts an example of a partial rotor lamination depicting a pocket defining concavities in the bridge region and filled with an epoxy including filler particles.

FIG. 14 depicts a tenth inner bridge rotor configuration 1400. The tenth inner bridge rotor configuration 1400 may be comprised of a rotor lamination 1406 constructed of a ferrous alloy and axially stacked. The rotor lamination 1406 may define a pocket 1414 that further defines a first concavity 1402 and a second concavity 1404. The first concavity 1402 and the second concavity 1404 may be formed in place of the inner bridge region (e.g., 404 of FIG. 4). The rotor lamination 1406 may be constructed such that the pocket 1414 includes regions for receiving a pair of magnets

244. The first concavity 1402 may be defined in a hub portion 1408 of the rotor laminations 1406. The second concavity 1404 may be defined in a pole portion 1405 of the rotor laminations 1406.

Areas of the pocket 1414 that do not receive the magnets 244 may be filled with a non-magnetic bonding material 1410. For example, the non-magnetic bonding material 1410 may be a resin or epoxy or other adhesive. Non-magnetic particles 1412 may be added to the non-magnetic bonding material 1410 to strengthen the bond. The non-magnetic particles 1412 may be formed from a metal and/or composite that material that is non-magnetic. The non-magnetic particles 1412 may be sized to fit within any areas of the pocket 1414. The non-magnetic particles 1412 may be mixed with the non-magnetic bonding material 1410 in a predetermined ratio. The first concavity 1402 and the second concavity 1404 may be embedded in the non-magnetic bonding material 1410 to provide a strong structural connection between the hub portion 1408 and the pole portion 1405.

Figure 15:
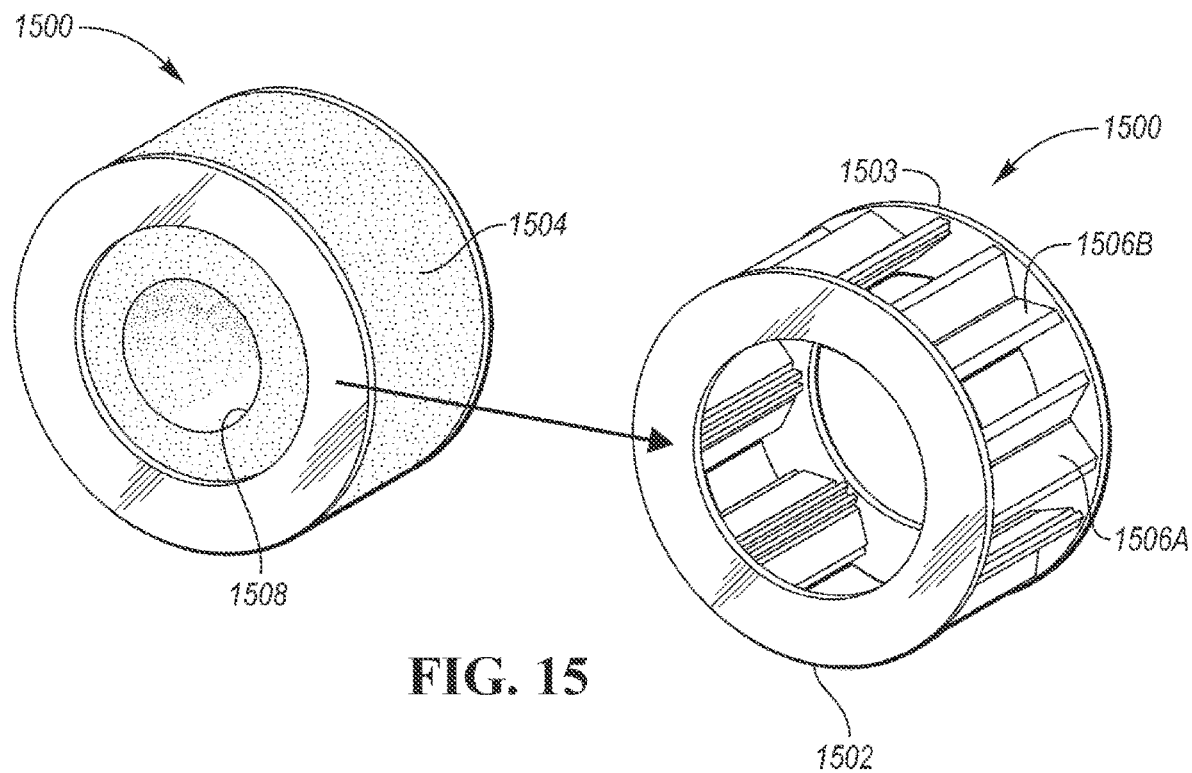
FIG. 15 depicts an example of a rotor comprising a non-magnetic material formed around end pieces and magnets.

FIG. 15 depicts an example of a rotor 1500. The rotor 1500 may include a first end ring 1502 and a second end ring 1503. The rotor 1500 may further include a plurality of magnets 1506 that are arranged between the first end ring 1502 and the second end ring 1503. For example, the magnets 1506 may be arranged in V-shaped pairs arranged to form poles of the rotor 1500. The rotor 1500 may be filled with a non-magnetic material 1504 to form the remainder of the rotor 1500. The non-magnetic material 1504 may be formed to define a central opening 1508. The non-magnetic material 1504 may be formed to define a cylindrical outer surface. The non-magnetic material 1504 may be molded around the magnets 1506 to form the rotor 1500. The non-magnetic material 1504 may be an epoxy or other adhesive that can be molded. The non-magnetic material 1504 enhances the structural integrity of the rotor 1500 and improve the magnetic leakage characteristics.

The rotor configurations described herein generally improve the operating characteristics of electric machines. The configurations reduce magnetic flux leakage and maintain structural integrity of the rotor. The configurations improve the torque production of the electric machine. While various configurations are depicted, additional variations are possible by combining the described features. The configurations provide structural integrity of the rotor in the inner bridge regions and allows for improved performance characteristics.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A rotor for an electric machine comprising:
    a plurality of magnets;
    a core comprised of stacked laminations that define pockets, between a hub portion and a pole portion, for receiving pairs of magnets, and that define a first concavity in the pole portion and a second concavity in the hub portion, the first concavity and the second concavity disposed in a bridge region between magnets that comprise the pairs;
    a clip disposed within the pockets, completely spaced away from the magnets, and connecting the first concavity and the second concavity, the first concavity and second concavity being shaped such that portions of the stacked laminations further define projections that extend into the pockets and between ends of the clip, and radial movement of the clip relative to the core results in engagement between the clip and projections without contacting the magnets; and
    a bonding material disposed in the pockets and embedding the clip, the first concavity and the second concavity.

2. The rotor of claim 1, wherein at least one of the first concavity and the second concavity are oval-shaped.

3. The rotor of claim 2, wherein the clip includes a bar extending between the first concavity and the second concavity and having a first end that cooperates with the first concavity and a second end that cooperates with the second concavity such that, when inserted with the first end in the first concavity and the second in the second concavity, motion of the bar is limited.

4. The rotor of claim 1, wherein the clip is formed of a non-magnetic metal material.

5. The rotor of claim 1 further comprising non-magnetic particles embedded in the bonding material to strengthen bonding.

6. The rotor of claim 1, wherein the bonding material is an epoxy.

7. The rotor of claim 1, wherein the clip is generally S-shaped.

8. A rotor for an electric machine comprising:
    a plurality of magnets;

a core comprised of stacked laminations that define pockets, between a hub portion and a pole portion, for receiving pairs of magnets, and that define an opening in a bridge region between magnets that comprise the pairs;

a bonding material disposed in the pockets in the bridge region; and at least one non-magnetic element embedded in the bonding material in the bridge region, completely spaced away from the magnets, and extending axially in the core.

9. The rotor of claim 8, wherein the non-magnetic element is bar shaped.

10. The rotor of claim 8, wherein the at least one non-magnetic element includes at least one angled surface.

11. The rotor of claim 8 further comprising non-magnetic particles embedded in the bonding material to strengthen bonding.

12. The rotor of claim 8, wherein the bonding material is an epoxy.

13. The rotor of claim 8, wherein the bonding material is a resin.

14. The rotor of claim 1, wherein the clip is generally H-shaped.

\* \* \* \* \*